United States Patent [19]

Dunham

[11] Patent Number: 5,778,197

[45] Date of Patent: Jul. 7, 1998

[54] METHOD FOR ALLOCATING SYSTEM RESOURCES IN A HIERARCHICAL BUS STRUCTURE

[75] Inventor: Scott Neil Dunham, Cary, N.C.

[73] Assignee: International Business Machines Corp., Armonk, N.Y.

[21] Appl. No.: 638,461

[22] Filed: Apr. 26, 1996

[51] Int. Cl.$^6$ ............................................. G06F 13/00
[52] U.S. Cl. ..................... 395/284; 395/306; 395/309; 395/823
[58] Field of Search ............................ 395/306, 308, 395/309, 307, 823, 281, 293, 284

[56] References Cited

U.S. PATENT DOCUMENTS 5,568,619 10/1996 Blackledge et al. .................. 395/281
5,568,621 10/1996 Wooten ................................ 395/292
5,621,900 4/1997 Lane et al. ........................... 395/300

*Primary Examiner*—Ayaz R. Sheikh
*Assistant Examiner*—Jigar Pancholi
*Attorney, Agent, or Firm*—Martin J. McKinley

[57] ABSTRACT

The system resources in a computer system having a multi-level, hierarchical bus structure are allocated by determining the address resource requirement of the devices and lower level PCI-PCI bridges, if any, subordinate to every higher level bridge by receiving address resource requirement information from each device and each lower level bridge, if any. Then, the address value of resource address requirement of the devices and lower level bridges requiring specific address allocation are sorted in an ascending order. Next, the size of resource address requirement of the devices and lower level bridges with non-specified address allocation is sorted in an descending order. Finally, the sorted list is grouped by an first fit algorithm to determine the resource allocation for each device within the bus hierarchy.

6 Claims, 6 Drawing Sheets

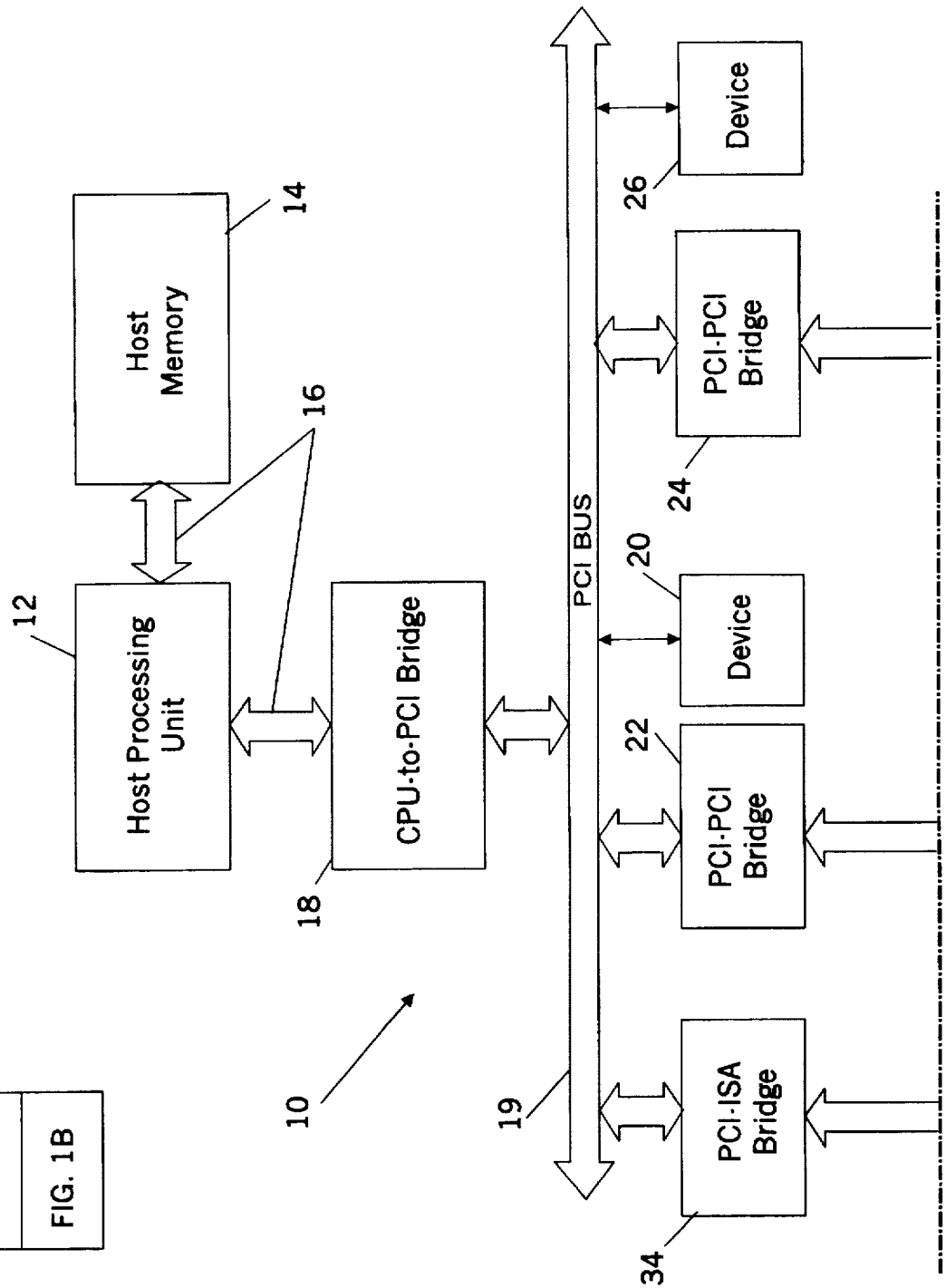

FIG. 2A

Non-Specified

C
Add. size: 20B
specified add: none
Alignment: 20h

Specified address

B
Add. size: 50b
specified add: 100h
Alignment: 50h

Non-specified

A
Add. size: 40b
specified add: none
Alignment: 40h

FIG. 2

| FIG. 2A | FIG. 2B |

FIG. 3

| FIG. 3A | FIG. 3B |

D
Add size 200b
specified add none
Alignment: 200h

B
Add. size: 50b
specified add: 100h
Alignment: 50h

E
Add. size: 20b
specified add: 20h
Alignment: 20b

FIG. 2B

| | Non-specified address | Specified address | Non-specified address | Non-specified |
|---|---|---|---|---|
| Add size 200b specified add: none Alignment: 200h | Add. size: 20b specified add: 20h Alignment: 20b | Add. size: 20b specified add: 1none Alignment: 20h | Add. size: 100b specified add: none Alignment: 100h | |
| D | E | F | G | |

FIG. 3B

| Add. size: 100b specified add: none Alignment: 100h | Add. size: 40b specified add: none Alignment: 40h | Add. size: 20B specified add: none Alignment: 20h | Add. size: 20b specified add: none Alignment: 20h |
|---|---|---|---|
| G | A | C | F |

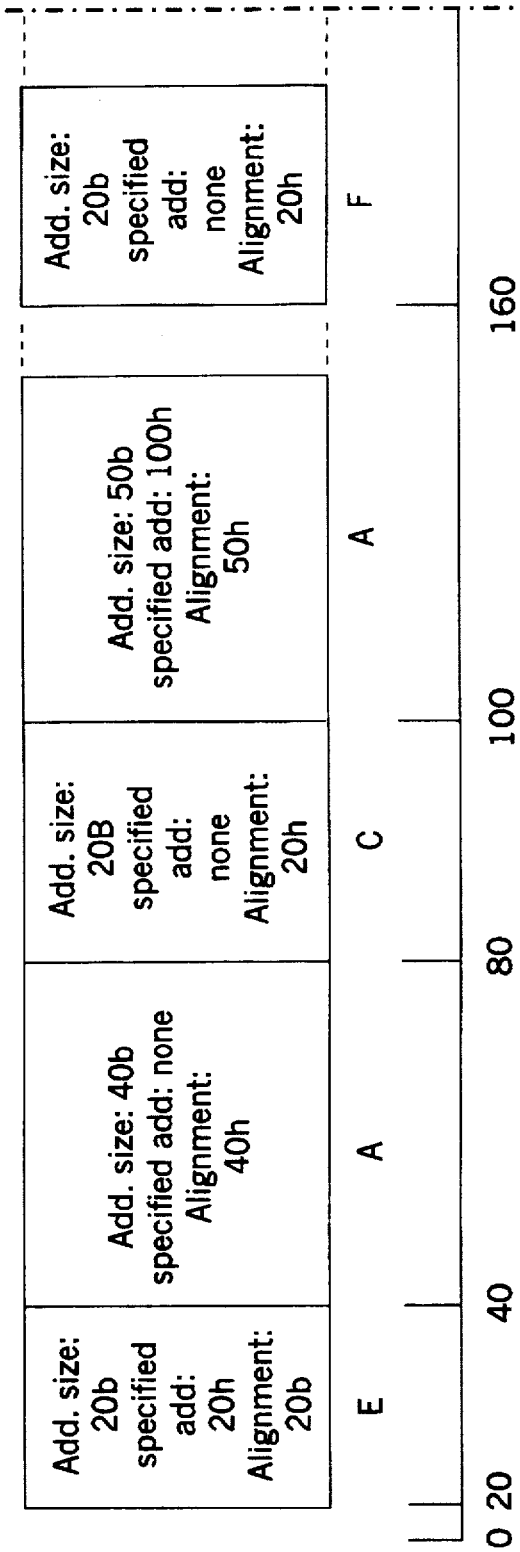

METHOD FOR ALLOCATING SYSTEM RESOURCES IN A HIERARCHICAL BUS STRUCTURE

BACKGROUND OF THE INVENTION

The present invention relates to personal computer systems and more particularly to allocating system resources in a computer system having hierarchical bus architecture.

Some computer systems include multiple buses for providing communication between various devices attached to the system and the Central Processing Unit (CPU). Examples of the different types of buses present in typical computer systems are a system bus to which a host CPU is attached and one or more peripheral buses to which one or more peripheral devices are attached. System-wide communication over different buses is required, however, if a device attached to one bus needs to read or write information to or from a device on another bus. Various types of buses are available to construct a given computer system. One such bus which is becoming widely accepted is the PCI (Peripheral Component Interconnect) bus, which is capable of performing significant data transfer in a relatively short period of time. The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate to the peripheral devices and the bus. The primary PCI bus operates on a synchronous clock signal of 33 MHZ, and the strings of data transmitted over the PCI bus are 32 bits wide. A 32-bit data string on the PCI bus is called a double word (DWORD), which is divided into 4 bytes each comprising 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45-47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide",revision 0.6, published Nov. 1, 1992 by the PCI Special Interest Group, the contents of which references (herein after referred to as PCI specification) are incorporated herein by reference as if they were fully set forth.

To permit system-wide communication between devices on different buses, bus-to-bus bridges are provided to match the communications protocol of one bus with that of another. Generally, bus-to-bus bridges in a multiple-bus computer system are used to couple two buses to each other. Thus, when coupling the host CPU bus to a PCI bus, a CPU-to-PCI bus bridge is used. However, when coupling two PCI buses to each other, a PCI-PCI bridge is used.

To satisfy user requirements for higher reliability and performance (e.g., as in servers) personal computer systems are being built with more and faster processors, faster networks, faster data storage and data redundancy. In order to support higher performance computer systems, multi-level hierarchical bus architectures are being implemented where multiple PCI buses are coupled to each other in a hierarchical order via PCI-to-PCI bus bridges. Each PCI-PCI bridge within the hierarchy attaches a higher level or superordinate PCI bus to a lower level or a subordinate PCI bus. With this arrangement, one or more devices may be attached to a superordinate or a subordinate bus at each level of hierarchy. PCI compliant devices may attach directly to a PCI bus, whereas, other devices, such as ISA devices may couple to a PCI bus through an ISA-PCI bus bridging logic. Each device attached to the bus hierarchy requires a predefined amount of system resources, such as I/O address space, memory Address space and prefetchable memory address space. The parameters for the system resources, such as size, alignment and starting address determine how a particular system resource address space is allocated to the devices. Some devices, such as those compliant with Industry Standard Architecture (ISA), may require address range below 1 megabyte address range, Read Only Memory (ROM) address space and IRQ assignment. On the other hand other devices, such as PCI compliant devices may not be restricted to a particular segment and thus be given resource allocation anywhere within the PCI architecture's 4 gigabyte address apace.

Therefore, a method is necessary to allocate the system resources to all the devices attached on the buses by taking into account the particular system requirement of each device. As it is well known, the memory or I/O address space allocation for all the devices behind the PCI-PCI bridges must be contained within a single window for each resource type. Each PCI-PCI bridge contains a set of registers for specifying the resource window that the bridge is to respond to and forward to its associated bus. If PCI-PCI bridges are attached subordinately behind another superordinate PCI-PCI bridge, the resource assignment for the devices behind the subordinate bridges (the ones attached to the PCI buses furthest from the CPU) must be contained in non-overlapping groups and these groups must be combined into single group behind the superordinate PCI-PCI bridge. Furthermore, the allocation of the system resources must be done tightly in a way that address space is not wasted.

One may allocate system resources on a fixed size basis without regard to device requirements. However, use of such an approach is likely to lead to wasted address space. On the other hand, performing sophisticated grouping techniques may lead to long set up times for the computer system as such sophisticated grouping techniques require substantial processing time. Therefore there exists a need for a simple, fast and efficient method for assigning resource requirements in a multi-level hierarchical PCI bus architecture.

SUMMARY OF THE INVENTION

Briefly, according to the present invention, the system resources in a computer system having a multi-level, hierarchical bus structure are allocated by determining the address resource requirement of the devices and lower level PCI-PCI bridges, subordinate to every higher level bridge by receiving address resource requirement information from each device and each lower level bridge, if any. Then, the value of resource address requirement of the devices and lower level bridges requiring specific address allocation are sorted in an ascending order. Next, the alignment of resource address requirement of the devices and lower level bridges with non-specified address allocation is sorted in an descending order. Finally, the sorted list is grouped by an first fit algorithm to determine the resource allocation for each bus within the bus hierarchy.

BRIEF DESCRIPTION OF THE DRAWING(S)

FIG. 2 is a diagram showing system resource requirements of devices attached to the hierarchical bus structure of FIG. 1.

FIG. 3 is a diagram of grouping of the devices of FIG. 2 according to the present invention.

FIG. 5 is a diagram of the combined system resource requirement for devices of FIG. 2.

DESCRIPTION OF THE ILLUSTRATIVE EMBODIMENT(S)

Figure 1B:
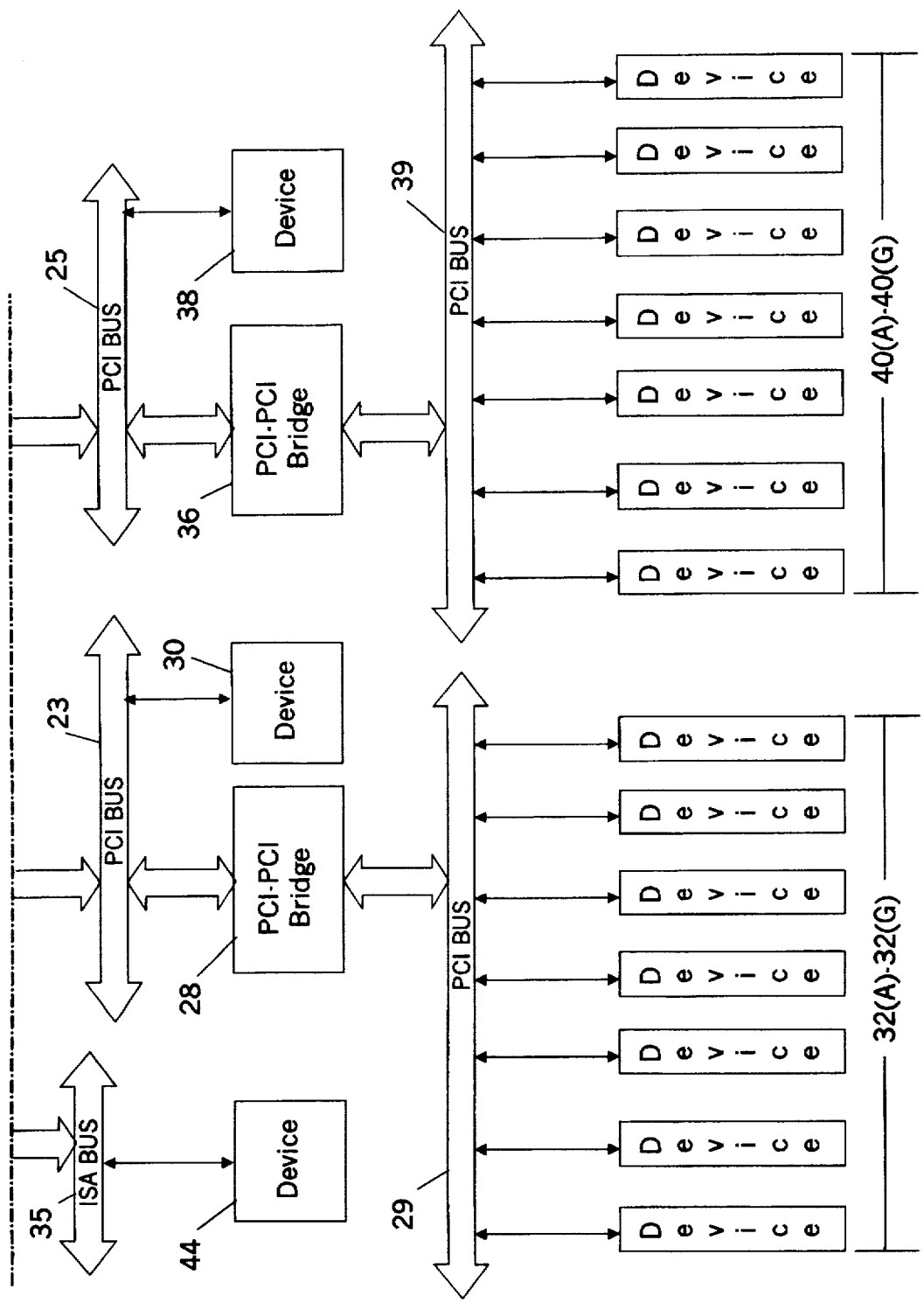
FIG. 1 is a block diagram of a computer system including a hierarchical bus structure in which the present invention may be advantageously used.

Referring to FIG. 1, an exemplary and simplified block diagram of a computer system 10 having a multi-level hierarchical PCI bus architecture is shown. In this exemplary system, one or more central processing units (CPUs) 12 and a memory 14, both coupled to a host (or primary) bus 16, interface with a PCI bus 19 via a well known host-to-PCI bus bridge 18. The CPUs may comprise one of many well known processing units, such as Pentium® Processor manufactured by the Intel® corporation. The host bus 16 conducts processor-unique signals. The host CPU-to-PCI bus bridge 18 converts the processor-unique signals of bus 16 to standardized signals for the PCI bus 19.

In this arrangement, the PCI bus 19 is the highest level PCI bus in the order of hierarchy of the computer system 10. The PCI bus 19 is coupled to two subordinate buses 23 and 25 via PCI-PCI bus bridges 22 and 24, respectively. PCI devices 30 and 38 are respectively attached to the PCI buses 23 and 25, as well. Also attached to the PCI bus 19 are PCI devices 20 and 26, which may comprise such devices as a video graphics controller for processing video signals displayed by the computer system 10. The exemplary embodiment of the computer system 10 may also include non-PCI devices attached to the hierarchical bus structure. As show, one of the devices attached to the bus 19 comprises ISA device 44, which is attached to the PCI buses 19 via an ISA bus 35 and a PCI-ISA bridge 34. As it is well known, however, the PCI-ISA bridge 34 and its associated ISA device 44 is seen by the PCI bus 19 as a PCI device and, therefore, is treated as such.

PCI-PCI bridges 28 and 36 respectively couple the PCI buses 23 and 25 to lower level subordinate PCI buses 29 and 39. Under this arrangement, the PCI buses 29 and 39 comprise the most subordinate buses of the system 10. As shown, a set of 7 PCI and non-PCI devices 32(A)–32(G) and 40(A)–40(G) are respectively attached to the most subordinate PCI buses 29 and 39.

As explained above, the bus hierarchy is compatible with the PCI architecture and, in the preferred embodiment, the processor complex 12 includes one (or more) microprocessors, which emit 32 bit addresses. As such, the computer system 10 is capable of addressing a 4 Gigabyte address space. The PCI standard defines certain resources that could be allocated to each device attached to a PCI bus. These resources comprise I/O address resources, memory address resources and prefetchable memory address resources. Each PCI device resource requirement comprises two parameters as defined by the PCI specification: 1) size of the requirement and 2) an alignment requirement. The size specifies the amount of memory resource required by the device, and the alignment specifies the allocation boundary for the device. The size and alignment requirement for each device can be determined as outlined in the PCI specification by writing to and reading from the device's Base Address Registers (BARs). Under the PCI standard, for each of these resources PCI-PCI bridges utilize a set of registers comprising a base register and a limit register. Therefore, each PCI-PCI bridge for its resources includes a set of I/O base and limit registers, memory base and limit registers, and prefetchable memory base and limit registers. These registers retain values specifying the base address and the range within which each bridge responds to a particular resource requirement. Thus, each bridge presents a window on the hierarchical bus structure of system 10 within which addresses are responded to and beyond which addresses are ignored.

As explained above, the computer system 10 allows for the PCI devices as well as legacy devices to its hierarchical bus architecture. The legacy devices are those devices that are compliant with already existing bus protocols such as ISA protocol. The PCI specification defines a set of Class Code Registers (CCRs) for identifying legacy devices.

The legacy devices, as well as PCI devices, may either have specified or non-specified system resource requirements. If a device has specified resource requirement, such specification may be determined in a system specific manner. The specified system resource requirement may be dictated through a hard-wired device specific setting or through an interface utility which allows a system user to specify the resource allocation requirements of one or more devices. For example, a particular legacy device may be hardwired to respond to a specific address within a 64K I/O address space as defined by ISA standard. Alternatively, using a device interface utility, devices may be programmed to respond to a user programmed address space.

At the start of operation, the computer system executes an initialization micro code, which identifies the PCI buses and bridges to the CPU. The PCI buses and bridges are identified by numbering such PCI buses and bridges in accordance with a predefined algorithm. Once identified, the CPU may initiate requests for information from the bridges and devices attached to each of the PCI buses using PCI standard defined protocol. During execution of the microcode, the CPU also identifies those devices with specified system resource requirements. The specified system resource requirements are part of each device's configuration information. Such configuration information is generally stored in a non-volatile RAM (NVRAM) space and is accessible by the CPU for determining the specific resource requirements of the devices.

Broadly, according to the present invention, the computer system 10 allocates system resources by determining the address resource requirement of the devices and lower level PCI-PCI bridges, subordinate to a higher level bus. The resource address requirements are determined by receiving address resource requirement information from each device and each lower level bridge, as explained before. Then, the value of address space requirement of the devices and lower level bridges with specified address allocation are sorted in an ascending order. Next, the alignment of resource address requirement of the devices and lower level bridges with nonspecified address allocation is sorted in a descending order. Finally, the sorted list is grouped by a first fit algoritlun to determine the resource allocation for each bus within the bus hierarchy.

More specifically, as explained above, the CPU executes appropriate conunands to determine the resource allocation requirement, i.e., size and alignment, for each device. Also during this step, the specified resource requirement of the devices are determined based on the device's particular configuration information. Once resource allocation requirements for each device are determined, the requirements for each PCI bus in the hierarchy is determined. The PCI bus requirement is determined by first identifying the most sub-ordinate buses within the hierarchy. Generally, the most subordinate buses, like buses 29 and 39, have only devices attach to them and do not couple to any PCI-PCI bridges for extending the bus hierarchy. Note that, as explained before, ISA bridge 34 and device 44 attached thereto is presented as a PCI device to the PCI bus 19. Once the most subordinate buses are identified, the resource allocation requirements of the devices attached to a particular most subordinate bus are grouped into one overall bus requirement. These devices are grouped by sorting the value of specified resource address requirements of the devices on a particular bus in an ascending order, then, the alignment of the resource address requirements with non-specified requirements is sorted in a descending order. Thereafter, a first fit method is used to obtain the overall resource requirement for that bus.

Referring to FIG. 2, a diagram showing system resource requirements of 7 exemplary devices, A–G, is shown. These devices may comprise one of the device sets 32(A)–32(G) or 40(A)–40(G). In this example it is assumed that the resource requirement comprises I/O address space, however, the principals of the present invention are easily applicable to other system resource requirements, such as memory address resource requirement and prefetchable memory address resource requirements. As shown device (A) has a non-specified I/O address requirement of 40 bytes. Device (B) has a I/O address requirement of 50 bytes which must start at I/O address 100 HEX. Devices (C) and (D) each have non-specified system resource requirement of 20 Bytes and 200 Bytes, respectively. Whereas, device (E) has a specified system resource requirement of 20 bytes which must start at address 20 HEX. Finally, devices (F) and (G) each have non-specified I/O address requirement of 20 bytes and 100 bytes, respectively.

Figure 4B:
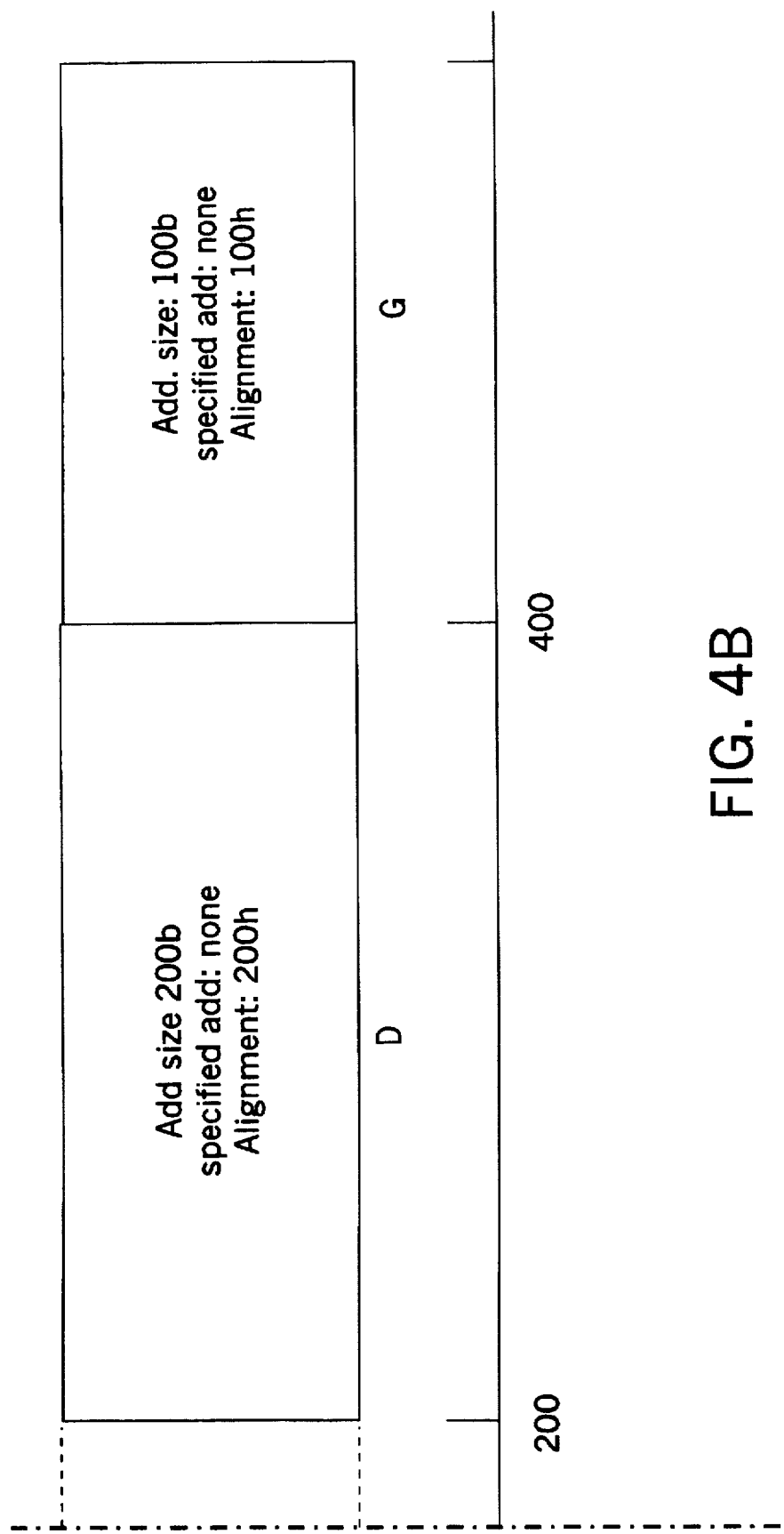
FIG. 4, is a diagram of the first fit operation for allocating system resources according to the present invention.

Referring to FIG. 3, a diagram of grouping of the devices (A–G) according to the invention is shown. Devices (E and B) which have specified resource requirements are grouped, by specified address value, in an ascending order, whereas, devices (D), (G), (A), (C) and (F) with non-specified resource requirements are grouped by alignment in a descending order. Referring to FIG. 4, the diagram of the first fit operation for allocating system resources based on the grouped diagram of FIG. 3 is shown. According to this diagram, device (E) is allocated with 20 Bytes of address space starting at the specified address 20 Hex and device B is allocated 100 Bytes address space starting at the specified address 100 HEX. Subsequently, the requirements for non-specified resource allocation devices are filled by proceeeding through the sorted list finding the first location in which the device requirement from the list will fit. Accordingly, the device (A) is allocated with 40 Bytes of address space starting at the non-specified address of 40 Hex. Similarity, using the first fit algorithm device (C) is allocated with 20 Bytes of address space starting at the allocated address 80 Hex. The first fit operation of the invention also takes into account the alignment requirements of the devices when allocating system resources to them. For example, device (F) which has an alignment requirement of 20 Bytes is assigned the starting address 160 Hex and not 150 HEX, the ending address for the requirement of device (B). Finally devices (D) and (G) having 200 Bytes and 100 bytes alignment requirement respectively are allocated 200 Bytes and 100 Bytes of address space starting at address 200 HEX and 400 HEX. Thus, as shown in FIG. 5, the combined resource requirement for devices A–G is a starting address of 20 HEX with a resource size requirement of 490 Bytes and an alignment requirement of 20 HEX. Once the resource requirements of the most subordinate buses of the hierarchy are determined, the method of the present invention performs resource requirement determination for PCI buses at the next higher order of hierarchy. This time , the resource requirement of the bridges and the devices attached to each higher order bus are grouped according to the above described method of the invention. It should be noted that bridges coupling to devices with specified resource requirement are treated as bridges with specified requirement at the next higher level of hierarchy. Similarly bridges coupling to bridges with specified resource requirements are treated as themselves having specified requirements. Once completed at one level, the overall requirement of the bridges coupling to yet the next higher order of hierarch are determined. This iterative process continues until the overall resource requirement for all the devices and bridges attached to the hierarchical bus structure is determined. At this time a location satisfying the overall resource requirement (size, alignment and specified resource address) is determined. The base address and limit values for each PCI-PCI bridge are then written based on the starting location found and the offset into the overall resource requirement pertaining to each PCI-PCI bridge. Similarly, the address assignment for each device is written into each device's Base Address Registers based on the starting location found for the overall resource requirement and the offset pertaining to that device's requirement. Similarly, when allocating memory address resource or prefetchable memory address resource, the base and limit address registers corresponding to a particular resource are written into with values derived using the above described method for allocating resources according to the present invention.

What is claimed is:

1. A method for allocating system resource address space for devices attached to a hierarchical bus structure, said hierarchical bus structure comprising a plurality of higher level and lower level buses coupled to each other via corresponding bus bridges, comprising iterative steps of:

a) determining the address resource requirement of the devices and lower level bridges subordinate to every higher level bridge by receiving address resource requirement information from each device and each lower level bridge;

b) grouping the devices and lower level bridges with specified address space requirement by sorting the address value of their system resource address space requirement in an ascending order;

c) grouping the devices and lower level bridges with non-specified address space requirement by sorting the alignment of their system resource address space requirement in a descending order;

d) grouping the devices and lower level bridges by performing a first fit algorithm; and e) obtaining one overall resource requirement based on the result of the first fit algorithm.

2. The method of claim 1, wherein the system resource address space comprises I/O address space.

3. The method of claim 1, wherein the system resource address space comprises memory address space.

4. The method of claim 1, wherein the system resource address space comprises prefetchable memory address space.

5. The method of claim 1, wherein the grouping of the system resource address space comprises the step of filling the address space gap created by grouping of step b) by first fitting the system resource address space requirement of resulted from grouping of step c).

6. The method of claim 1, wherein the hierarchical bus structure comprises a PCI compliant bus structure and the bus bridges comprise PCI-PCI bus bridges.

* * * * *